3,264,110
POLYMETHINE DYES
Henri Depoorter, Marcel Jan Libeer, Gerrit Godfried van Mierlo, and Jean Marie Nys, all of Mortsel-Antwerp, Belgium, assignor to Gevaert Photo-Producten N.V., Mortsel-Antwerp, Belgium, a Belgian company
No Drawing. Continuation of abandoned application Ser. No. 62,107, Oct. 12, 1960. This application Jan. 30, 1964, Ser. No. 341,445
Claims priority, application Great Britain, Oct. 13, 1959, 34,641/59
12 Claims. (Cl. 96—106)

This application is a continuation of our copending application Serial No. 62,107, filed October 12, 1960, and now abandoned.

This invention relates to new cyanine dye salts and to their preparation and use as sensitizers for photographic silver halide emulsions, and to methods of sensitizing such emulsions by means of such sensitizing dyes.

We have found a new class of cyanine dye salts containing at least one benzimidazole nucleus, wherein at least one of the hydrogen atoms of the benzene ring forming part of said benzimidazole nucleus is substituted by a member selected from the group consisting of a fluorine atom and a cyano group.

More particularly we provide new cyanine dye salts represented by the following general formula:

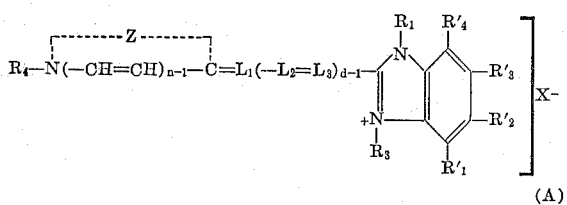

(A)

wherein in $R_1$, $R_3$ and $R_4$ each represents a substituent of the type contained in cyanine dyes on the cyanine nitrogen atom e.g. an alkyl group such as methyl, ethyl, propyl, isopropyl, butyl, isobutyl, allyl (vinyl methyl), β-hydroxyethyl, β-acetoxyethyl, sulfoethyl, sulfopropyl, sulfobutyl, propylsulfate, butylsulfate, benzyl (phenyl methyl), carboxybenzyl, the group —A—CO—O—B—SO$_2$—OH wherein A and B have the same significance as set forth in Serial No. 742,713 filed June 18, 1958, which application forms the basis of U.S. Patent No. 3,156,685 such as e.g. omega-acetyl sulfonamidopropyl, omega-acetyl sulfonamidobutyl, beta-methylsulfonylamino ethyl, the group —A—W—NH—V—B wherein A, W, V and B have the same significance as set forth in Serial No. 746,347, filed July 3, 1958, which application corresponds to British Patent No. 904,332, an aryl radical such as phenyl, carboxyphenyl etc. (e.g. a mononuclear aryl radical of the benzene series) or a cycloalkyl radical such as cyclohexyl; $L_1$, $L_2$ and $L_3$ each represents a methine group, e.g. =CH—, =C.CH$_3$—, =C.C$_2$H$_5$—, =C.C$_3$H$_7$—, =C.CH$_2$C$_6$H$_5$—, =C.C$_6$H$_5$—
=C.O-alkyl—, =C.S.-alkyl—, =C.Se-alkyl—,
=C.O.-acyl—, =C.COO-C$_2$H$_5$—, =C.NHR'—
=C.NHCOR, =C.CONHR (wherein R and R' are hydrogen or have the same significance as set forth above for $R_1$, $R_3$ and $R_4$),

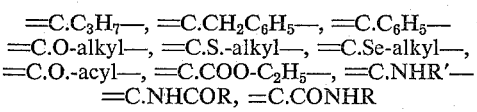

(wherein D represents a heterocyclic radical, and r represents 0 or a positive integer from 1 to 6), or a methine group forms part of a heterocyclic or isocyclic ring such as for example a cyclopentadiene ring; n represents the positive integer 1 or 2; d represents a positive integer from 1 to 4; Z represents the atoms necessary to complete a heterocyclic nitrogen nucleus of the type contained in cyanine dyes such as those of the thiazole series (e.g.

Thiazole,
4-methylthiazole,
4-phenylthiazole,
5-methylthiazole,
5-phenylthiazole,
4,5-dimethylthiazole,
4,5-diphenylthiazole,
4-(2-thienyl)-thiazole, etc.), those of the benzothiazole series (e.g.
Benzothiazole,
4-chlorobenzothiazole,
5-chlorobenzothiazole,
6-chlorobenzothiazole,
7-chlorobenzothiazole,
3-ethylbenzothiazole,
4-methylbenzothiazole,
5-methylbenzothiazole,
6-methylbenzothiazole,
5-bromobenzothiazole,
6-bromobenzothiazole,
4-phenylbenzothiazole,
5-phenylbenzothiazole,
4-methoxybenzothiazole,
5-methoxybenzothiazole,
6-methoxybenzothiazole,
5-iodobenzothiazole,
6-iodobenzothiazole,
4-ethoxybenzothiazole,
5-ethoxybenzothiazole,
4,5,6,7-tetra-hydrobenzothiazole,
5,6-dimethoxybenzothiazole,
5,6-dioxymethylene-benzothiazole,
5-hydroxybenzothiazole,
6-hydroxybenzothiazole,
5,6-dimethylbenzothiazole,
3-ethyl-5-methylbenzothiazole,
3-ethyl-5,6-dimethylbenzothiazole, etc.), those of the naphthothiazole series (e.g.
Alpha-naphthothiazole,
Beta-naphthothiazole,
5-methoxy-beta-naphthothiazole,
5-ethoxy-beta-naphthothiazole,
8-methoxy-alpha-naphthothiazole,
7-methoxy-alpha-naphthothiazole, etc.), those of the thionaphtheno-7',6',4,5-thiazole series (e.g.
4'-methoxythionaphtheno-7',6',4,5-thiazole etc.), those of the oxazole series (e.g.
4-methyloxazole,
5-methyloxazole,
4-phenyloxazole,
4,5-diphenyloxazole,
4-ethyloxazole,
4,5-dimethyloxazole,
5-phenyloxazole, etc.), those of the benzoxazole series (e.g.
Benzoxazole,
5-chlorobenzoxazole,
3-ethyl-5-chlorobenzoxazole,
3-ethyl-5,6-dimethylbenzoxazole,
5-methylbenzoxazole,
5-phenylbenzoxazole,
6-methylbenzoxazole,
5,6-dimethylbenzoxazole,
4,6-dimethylbenzoxazole,
5-methoxybenzoxazole,
6-methoxybenzoxazole,
5-hydroxybenzoxazole,
6-hydroxybenzoxazole, etc.), those of the naphthoxazole series (e.g.

Alpha-anphthoxazole,
Beta-naphthoxazole, etc.), those of the selenazole series (e.g.
4-methylselenazole,
4-phenylselenazole, etc.), those of the benzoselenazole series (e.g.
Benzoselenazole,
3-ethylbenzoselenazole,
5-chlorobenzoselenazole,
5-methoxybenzoselenazole,
5-hydroxybenzoselenazole,
4,5,6,7-tetrahydrobenzoselenazole, etc.), those of the naphthoselenazole series (e.g.
Alpha-naphthoselenazole,
Beta-naphthoselenazole, etc.), those of the thiazoline series (e.g.
Thiazoline,
4-methylthiazoline,
4-hydroxymethyl-4-methylthiazoline,
4,4-bis-hydroxymethylthiazoline,
4-acetoxymethyl-4-methyl-thiazoline,
4,4-bis-acetoxymethylthiazoline, etc.), those of the thiazoline series (e.g.
2-benzothiazolylidene-4-thiazolidone etc.), those of the oxazoline series (e.g.
Oxazoline,
4-hydroxymethyl-4-methyl-oxazoline,
4,4-bis-hydroxymethyl-oxazoline,
4-acetoxymethyl-4-methyl oxazoline,
4,4-bis-acetoxymethyl-oxazoline, etc.), those of the oxazolidine series, those of the selenazoline series, (e.g.
Selenazoline), those of the 2-quinoline series (e.g. the Quinoline,
1-methylquinoline,
3-methylquinoline,
5-methylquinoline,
7-methylquinoline,
8-methylquinoline,
6-chloroquinoline,
8-chloroquinoline,
6-methoxyquinoline,
6-ethoxyquinoline,
6-hydroxyquinoline,
8-hydroxyquinoline, etc.), those of the 4-quinoline series (e.g.
Quinoline,
6-methoxyquinoline,
7-methylquinoline,
8-methylquinoline etc.), those of the 1-isoquinoline series (e.g.
Isoquinoline,
3,4-dihydroisoquinoline, etc.), those of the 3-isoquinoline series (e.g. the isoquinoline etc.), those of the 3,3-dialkylindolenine series (e.g.
3,3-dimethylindolenine,
3,3,5-trimethylindolenine,
3,3,7-trimethylindolenine, etc.), those of the pyridine series (e.g.
Pyridine,
5-methylpyridine, etc.), those of the benzimidazole series (e.g.
1-ethylbenzimidazole,
1-phenylbenzimidazole,
1-ethyl-5,6-dichlorobenzimidazole,
1-hydroxyethyl-5,6-dichlorobenzimidazole,
1-phenyl-3-acetoxyethyl-5,6-dichlorobenzimidazole,
1-ethyl-5-chlorobenzimidazole,
1-ethyl-5,6-dibromobenzimidazole,
1-ethyl-5-phenylbenzimidazole,
1-ethyl-5-fluorobenzimidazole,
1-ethyl-3-(beta-acetoxyethyl)-5-cyanobenzimidazole,
1-ethyl-3-[N-(methylsulfonyl)-carbamylmethyl]-5-cyano benzimidazole,
1-ethyl-3-(γ-propylsulphate)-5-cyano benzimidazole,
1-ethyl-3-[γ-(acetylsulfonamido)-propyl]-5-cyano benzimidazole,
1,3-diethyl-5-chlorobenzimidazole,
1,3-diethyl-5,6-dichlorobenzimidazole,
1-(β-acetoxyethyl)-3-(β-hydroxyethyl)-5-cyanobenzimidazole,
1,3-bis(β-acetoxyethyl)-5-cyano benzimidazole,
1-ethyl-3-[δ-(acetylsulfonamido)-butyl]-5-cyano benzimidazole,
1-ethyl-3-(β-hydroxyethyl)-5-cyano benzimidazole,
1,3-diethyl-5-chloro-6-cyano benzimidazole,
1,3-diethyl-5-fluoro-6-cyano benzimidazole,
1,3-diethyl-5-cyanobenzimidazole,
1-ethyl-3-(β-acetoxyethyl)-5-fluorobenzimidazole,
1-ethyl-3-[δ-(acetylsulfonamido)-butyl]-5-fluoro-benzimidazole,
1-ethyl-5-acetyl-benzimidazole,
1-ethyl-3-(β-hydroxyethyl)-5-fluorobenzimidazole,
1,3-diethyl-5-chloro-6-fluorobenzimidazole,
1,3-diethyl-5-fluorobenzimidazole,
1-ethyl-5-cyano benzimidazole,
1-ethyl-5-carboxybenzimidazole,
1-ethyl-7-carboxybenzimidazole,
1,3-diethyl-5-carbethoxybenzimidazole,
1-ethyl-3-(p-carboxybenzyl)-5-carbethoxybenzimidazole,
1-ethyl-3-[γ-(acetylsulfonamido)-propyl]-5-carbethoxybenzimidazole,
1,3-diethyl-7-carbethoxybenzimidazole,
1-ethyl-3-(β-hydroxyethyl)-7-carbethoxybenzimidazole,
1-ethyl-5-sulfonamidobenzimidazole,
1-ethyl-5-N-ethylsulfonamido benzimidazole, etc.), and X represents an acid radical of the type used in cyanine dyes such as chloride, bromide, iodide, perchlorate, benzene sulphonate, p-tolusulphonate, methylsulphate, ethylsulphate, propyl sulphate or the like, $R'_1$, $R'_2$, $R'_3$ and $R'_4$ each represents a member selected from the group consisting of a hydrogen atom, a chlorine atom, a bromine atom, a fluorine atom, a cyano group, at least one of the radicals $R'_1$, $R'_2$, $R'_3$ and $R'_4$ representing a member selected from the group consisting of a fluorine atom and a cyano group.

According to the process of our invention we prepare the cyanine dye salts represented by the Formula A starting from the benzimidazolium quaternary salts represented by the general formula:

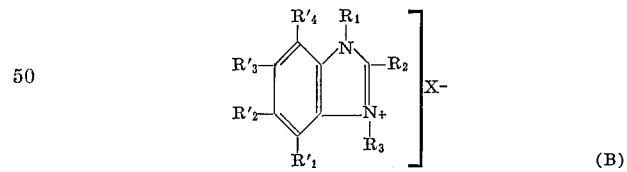

(B)

wherein $R_1$, $R_3$, $R'_1$, $R'_2$, $R'_3$, $R'_4$ and X have the same values as set forth above and $R_2$ represents a reactive group known in cyanine chemistry such as a methyl group.

The quaternary salts employed in the present invention can be obtained by treating the benzimidazole derivatives of U.S. patent application Serial No. 58,215, filed September 26, 1960, the pertinent subject matter of which appears in British Patent No. 955,961, according to the usual methods known to those skilled in the art.

The new cyanine dye salts according to the present invention may be obtained by starting from the new benzimidazolium salts by application of the usual condensation methods known to those skilled in the art.

The following description of some methods for preparing the new cyanine dye salts is not complete and therefore is not to be considered as limiting the scope of our invention but merely as a survey of the most usual condensation methods.

The new asymmetrical and symmetrical cyanine dye salts according to the present invention can be prepared by condensing a benzimidazolium salt of the general Formula B with a cyclammonium quaternary salt represented by the following formula:

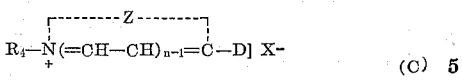

wherein $R_4$, X, Z and $n$ have the meanings set forth above and D represents a member selected from the group consisting of an alkylmercapto group, an arylmercapto group, a beta-arylaminovinyl group, a delta-arylamino-1,3-butadienyl group, a beta-alkylmercaptovinyl group, a beta-arylmercaptovinyl group or a beta-acetanilido vinyl group, which vinyl groups may carry a substituent. The condensations are advantageously carried out in the presence of a basic condensing agent, for example a trialkylamine such as triethylamine, a dialkylanilene, a heterocyclic tertiary amine such as pyridine or N-alkyl-piperidine or the like. The condensation can also be carried out in the presence of an inert diluent such as methanol, ethanol, diethylether, acetone, 1,4-dioxane, etc.

The new asymmetrical and symmetrical cyanine dye salts according to the present invention can also be prepared by condensing acetarylide intermediates represented by the following formula:

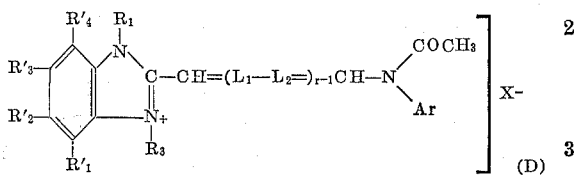

wherein $R_1$, $R_3$, $R'_1$, $R'_2$, $R'_3$, $R'_4$, X, $L_1$ and $L_2$ have the same meanings as set forth above, $r$ represents an integer from 1 to 3 and Ar represents an aryl group with cyclammonium quaternary salts containing a methyl group in $\alpha$- or $\gamma$-position, such as those represented by the following general formula

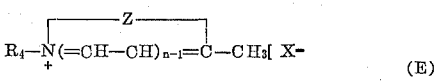

wherein $R_4$, X, Z and $n$ have the meanings set forth above.

The condensations are advantageously carried out in the presence of a basic condensing agent as set forth above.

The acetarylide intermediates represented by the Formula D can be prepared by condensing a benzimidazolium salt from those represented by Formula B with a compound represented by the following formula:

Ar—N=(L$_1$—L$_2$=)$_{r-1}$CH—NH—Ar       (F)

wherein $L_1$, $L_2$, Ar and $r$ have the meanings set forth above, and by boiling the arylaminovinyl intermediates or vinylene homologues thereof obtained with acetic anhydride.

The new symmetrical cyanine dye salts can also be prepared according to the process of our invention by condensing a benzimidazolium quaternary salt selected from those represented by Formula B with an ortho-carboxylic acid alkyl ester, such as ethyl ortho-formate, advantageously in a nitrobenzene solution.

PREPARATION 1

1,3-diethyl-2-methyl-5-cyano benzimidazolium iodide

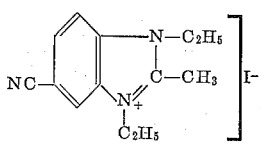

5.8 g. of 1-ethyl-2-methyl-5-cyano benzimidazole prepared according to the method of Example 1 of the pending U.S. patent application Serial No. 58,215 filed September 26, 1960, and Example 7 of British Patent No. 955,961 and 5.8 g. of ethyl iodide are heated for 24 hours at 100° C., cooled and washed with acetone and ether.

Yield: 10.3 g. of a product with a melting point at 260° C. The same product is obtained when using 1-ethyl-2-methyl-6-cyanobenzimidazole instead of 1-ethyl-2-methyl-5-cyano benzimidazole.

PREPARATION 2

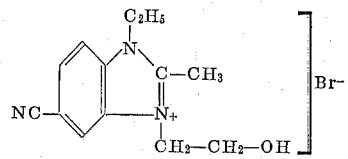

5.55 g. of 1-ethyl-2-methyl-5-cyanobenzimidazole and 3.75 g. of ethylene-bromohydrine are mixed and heated for 4 hours at 105° C. The reaction product is then cooled, and washed with ether and acetone. Yield: 7.5 g. of a product not melting below 250° C.

PREPARATION 3

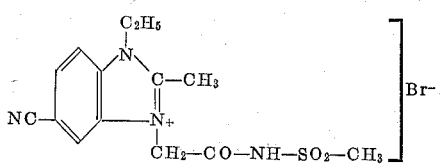

4.65 g. of 1-ethyl-2-methyl-5-cyano benzimidazole and 5.4 g. of N-(bromo-acetyl)-methane sulfonamide are heated at 105–110° C. for 1 hour. The quaternary salt is cooled, and washed with ether and acetone. Yield: 9.6 g.

PREPARATION 4

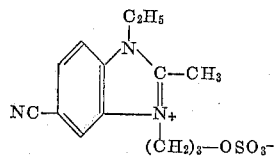

4.65 g. of 1-ethyl-2-methyl-5-cyano benzimidazole and 3.5 g. of propylene sulfate are heated for 1 hour at 105–110° C., cooled and washed with ether and acetone. Yield: 7.95 g.

PREPARATION 5

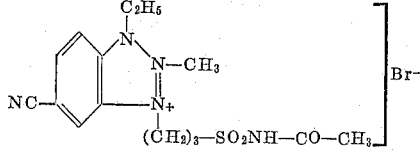

5.6 g. of 1-ethyl-2-methyl-5-cyano benzimidazole and 7.3 g. of N-acetyl-3-bromo-propane sulfonamide are heated for 4 hours at 105° C., cooled, washed with ether and acetone. Yield: 10.5 g.

PREPARATION 6

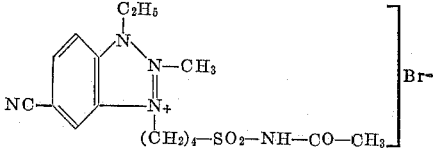

5.55 g. of 1-ethyl-2-methyl-5-cyano benzimidazole and 7.74 g. of N-acetyl-4-bromobutane sulfonamide are heated for 7 hours at 105° C. After adding a few cm.³ of acetone, the mixture is cooled, and washed with ether. Yield: 5.1 g.

PREPARATION 7

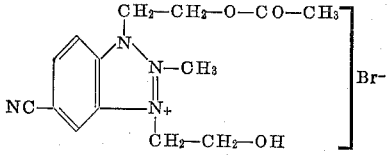

12 g. of 1-($\beta$-acetoxyethyl)-2-methyl-5-cyano benzimidazole and 6.85 g. of ethylene bromothydrine are heated for 5 hrs. at 110° C. cooled and washed with acetone. Yield: 14 g. of a product with melting point at 202° C.

PREPARATION 8

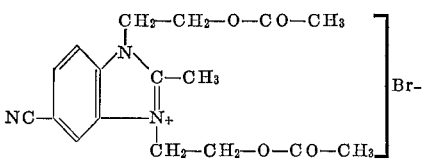

3.7 g. of 1-(β-acetoxyethyl)-2-methyl-3-(β-hydroxyethyl)-5-cyano benzimidazolium bromide prepared according to the foregoing preparation and 30 cm.³ of acetic anhydride are refluxed for 15 minutes, cooled and treated with ether. Yield: 4 g. of a product melting at 250° C.

PREPARATION 9

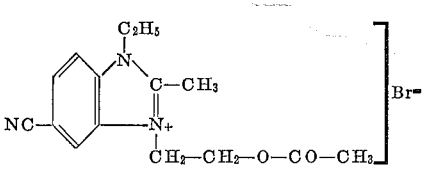

9.3 g. of 1-ethyl-2-methyl-3-(β-hydroxyethyl)-5-cyano benzimidazolium bromide and 50 cm.³ of acetic anhydride are refluxed for 10 minutes, cooled and treated with ether. Yield: 9.1 g.

PREPARATION 10

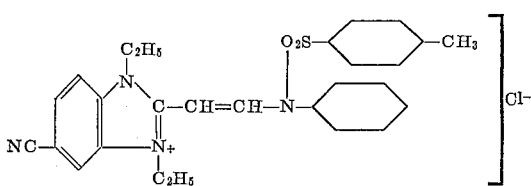

40.9 g. of 1,3-diethyl-2-methyl-5-cyano benzimidazolium iodide and 30 g. of diphenylformamidine are heated for 90 minutes on an oil-bath at 170° C. under diminished pressure (1 mm. Hg); 85% of the theoretical amount of aniline is distilled off during this period. The reaction product is cooled and washed with acetone and ether. Yield: 47.6 g. of 1,3-diethyl-2-(β-anilinovinyl)-5-cyano-benzimidazolium iodide, melting point: 265° C. To 40 g. of this product suspended in 200 cm.³ of acetone is added with stirring 7.2 g. of sodium hydroxide in 72 cm.³ of water. After stirring for one hour more, the whole is poured into one liter of ice, washed with water until neutral, dried and recrystallized from benzene-n-hexane. Yield: 23 g. of 1,3-diethyl-2-(β-phenylimino ethylidene)-5-cyano-benzimidazoline, melting point: 175° C. To a solution of this product in a minimum quantity of acetone is added at room temperature 15.3 g. of p-tolusulfochloride, dissolved in a minimum of acetone too. After standing overnight, the crystals are filtered with suction and washed with ether. Yield: 23 g. of 1,3-diethyl-2-(β-p-tolusulfoanilido)vinyl-5-cyano-benzimidazolium chloride, melting point: 185° C.

PREPARATION 11

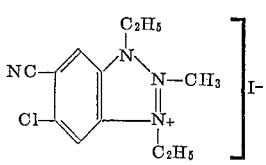

1.7 g. of 1-ethyl-2-methyl-5-chloro-6-cyano benzimidazole and 1.3 g. of ethyl iodide are heated for 24 hours at 105° C., cooled and washed with ether. Yield: 2.7 g.

PREPARATION 12

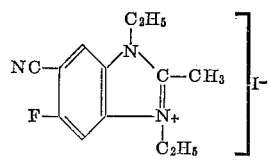

2.2 g. of 1-ethyl-2-methyl-5-fluoro-6-cyano benzimidazole and 1.8 g. of ethyl iodide are heated for 16 hours at 110° C. in a sealed tube, cooled and washed with acetone and ether. Yield: 3.3 g. of a product, not melting below 250° C.

PREPARATION 13

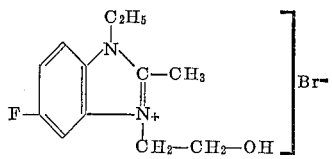

10.7 g. of 1-ethyl-2-methyl-5-fluorobenzimidazole and 7.5 g. of ethylene bromohydrine were heated for 2 hours at 100° C., cooled and washed with acetone and ether. Yield: 13.7 g. Melting point: 248° C.

PREPARATION 14

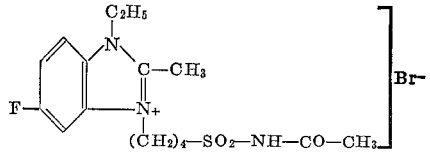

10.7 g. of 1-ethyl-2-methyl-5-fluorobenzimidazole and 15.5 g. of N-acetyl-4-bromobutanesulfone were heated for 5 hours at 110° C. cooled and washed with acetone and ether. Yield: 13.3 g. Melting point: 198° C.

PREPARATION 15

1,3-diethyl-2-methyl-5-fluorobenzimidazolium iodide

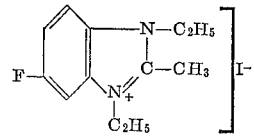

14.4 g. of 1-ethyl-2-methyl-5-fluorobenzimidazole prepared according to the method of Example 1 of the pending U.S. patent application Serial No. 58,214, filed Sept. 26, 1960, and Example 2 of British Patent No. 955,-961 and 16.3 g. of ethyl iodide are heated for 20 hours at 100° C. in a sealed tube, cooled and washed with acetone. Yield: 25 g. of a product with a melting point at 218° C.

PREPARATION 16

1,3-diethyl-2[β-(p-tolusulfoanilino)vinyl] - 5 - chlorobenzimidazolium chloride

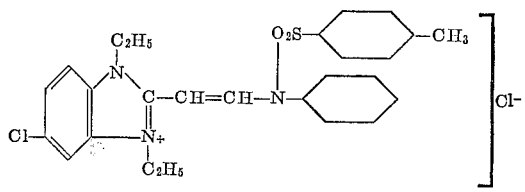

30.35 g. of 1,3-diethyl-2-methyl-5-chlorobenzimidazolium bromide and 25.5 g. of diphenylformamidine are heated under vacuum (1 mm. Hg) in an oil-bath at 170° C. After 2 hours 90% of the theoretical amount of aniline is distilled off. The reaction product is cooled and washed with acetone and ether. Yield: 25 g. of 1,3-diethyl-2-(β-anilinovinyl)-5-chlorobenzimidazolium bromide, melting at 228° C. after recrystallization from ethanol. To a suspension of 20.3 g. of this product in 100 cm.³ of acetone, is added with stirring a solution of 4 g. of sodium hydroxide in 50 cm.³ of water. After stirring for one hour, the reaction mixture is poured into 500 cm.³ of water and let stand overnight. The product is sucked off and washed with water. Yield: 14.4 g. of 1,3-diethyl-2-(β-phenyliminoethylidene) - 5 - chlorobenzimidazoline. Melting point: 157° C. To a solution of 6 g. of this product in a minimum quantity of acetone is added 4 g. p-tolusulfochloride, dissolved in a minimum of acetone too. After standing for two hours, the crystals are filtered and washed with water. Yield: 7.45 g. of 1,3 - diethyl-2-[β-(p-tolusulfoanilido)vinyl] - 5 - chlorobenzimidazolium chloride, melting point: 187° C.

PREPARATION 17

1,3 - diethyl - 2 - methyl-5-chloro-6-fluorobenzimidazolium iodide

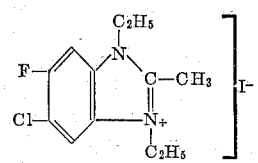

3.6 g. of 1-ethyl-2-methyl-5-chloro-6-fluoro benzimidazole and 2.8 g. of ethyl iodide are heated overnight at 110° C., cooled and washed with acetone and ether. Yield: 5.6 g. Melting point: 268–270° C. The same product is obtained using 1-ethyl-2-methyl-5-fluoro-6-chlorobenzimidazole instead of 1-ethyl-2-methyl-5-chloro-6-fluorobenzimidazole.

PREPARATION 18

1,3-diethyl - 2 - [β-(p-tolusulfoanilido)vinyl]-5,6-dichlorobenzimidazolium chloride

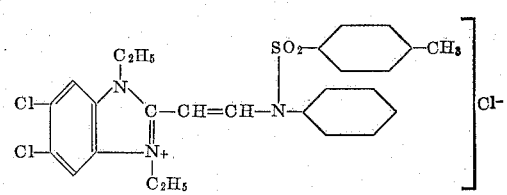

96 g. of 1,3-diethyl-2-methyl-5,6-dichlorobenzimidazolium iodide and 65 g. of diphenylformamidine were heated under diminished pressure in an oil-bath at 170° C. After two hours the theoretical amount of aniline was distilled off and the reaction mixture cooled and washed with acetone and ether. The yield of 1,3-diethyl-2-(β-anilinovinyl) - 5,6 - dichlorobenzimidazolium iodide with melting point at 265° C. was 118 g. 49 g. of this product suspended in acetone were treated with 8 g. of sodium hydroxide in 75 cm.³ of water. The mixture was stirred for 45 minutes and poured into 2 lit. of water. The precipitate was collected and recrystallized from benzene-hexane. Yield: 30.5 g. of 1,3-diethyl-2-(β-phenyl-iminoethylidene) - 5,6 - dichlorobenzimidazoline with melting point at 148° C. To 30.5 g. of this product in 230 cm.³ of acetone was added 20.2 g. of p-tolusulfochloride in 50 cm.³ of acetone. After 1 hour the precipitated 1,3-diethyl - 2 - [β-(p-tolusulfoanilido)vinyl]-5,6 - dichlorobenzimidazolium chloride was filtered with suction and washed with ether. Yield: 44.6 g. Melting point: 228° C.

The following examples will serve to illustrate further the maner of obtaining our new polymethine dyes.

Example 1

The dyestuff according to formula

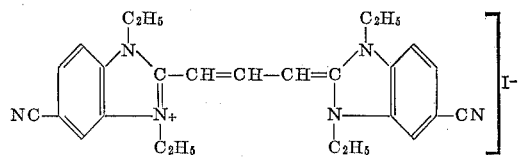

is prepared as follows: 6.82 g. of 1,3-diethyl-2-methyl-5-cyano benzimidazolium iodide obtained according to Preparation 1, 8 cm.³ of ethyl-ortho-formate and 50 cm.³ of nitrobenzene were refluxed for 2 hrs., cooled and diluted with ether. The pure dyestuff was obtained by recrystallization from ethanol. Melting point: 267° C. Absorption maximum: 514 mμ (log ε=5.32).

Example 2

The dyestuff according to formula

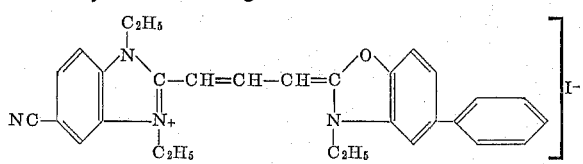

is prepared as follows: 4.5 g. of 1,3-diethyl-2-methyl-5-cayano benzimidazolium iodide, obtained according to Preparation 1, 4.5 g. of 2-(β-phenylimino ethylidene)-3-ethyl-5-phenylbenzoxazoline, 25 cm.³ of acetic anhydride and 1.9 cm.³ of triethylamine were refluxed for 10 minutes. After cooling, the dyestuff was precipitated with ether and recrystallized from ethanol. Melting point: 178° C. Absorption maximum: 493 mμ (log ε: 4.61).

Example 3

The dyestuff according to formula

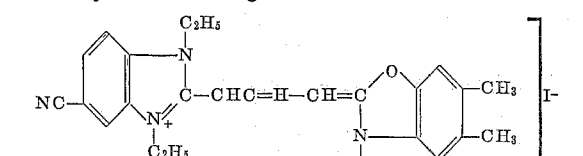

is prepared as follows: 3.41 g. of 1,3-diethyl-2-methyl-5-cyano benzimidazolium iodide obtained according to Preparation 1, 2.92 g. of 2-(β-phenylimino ethylidene)-3-ethyl-5,6-dimethyl benzoxazoline and 20 cm.³ of acetic anhydride were refluxed for 15 minutes, cooled and poured into ether. The dyestuff precipitated and was recrystallized from ethanol. Melting point: 248° C. Absorption maximum: 497 mμ (log ε: 5.07).

Example 4

The dyestuff according to formula

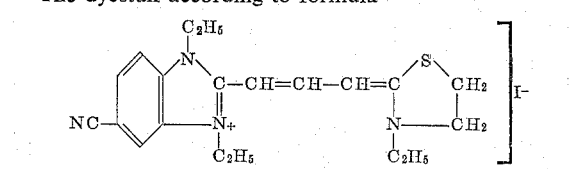

is prepared as follows: 3.13 g. of 2-(β-anilinovinyl) thiazolinium bromide was dissolved in 20 cm.³ of boiling acetic anhydride, 3.41 g. of 1,3-diethyl-2-methyl-5-cyano benzimidazolium iodide obtained according to Preparation 1 and 2.8 cm.³ of triethylamine were added and the mixture refluxed for 5 minutes. On cooling, the dyestuff crystallized; purification is by recrystallization from ethanol. Melting point: 250° C. Absorption maximum: 472 mμ (log ε: 5.12).

Example 5

The dyestuff according to formula

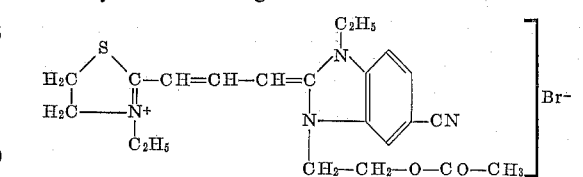

is prepared as follows: 3.1 g. of 1-ethyl-2-methyl-3-(β-hydroxyethyl)-5-cyano benzimidazolium bromide prepared according to Preparation 2, 3.1 g. of 2-(β-anilino-vinyl)-3-ethyl thiazolinium bromide, 25 cm.³ of acetic anhydride and 2.8 cm.³ of triethylamine were refluxed for 20 minutes. After cooling, the dyestuff was precipitated with ether and recrystallized three times from ethanol. Melting point: 162° C. Absorption maximum: 470 mμ (log ε: 5.11).

*Example 6*

The dyestuff according to formula

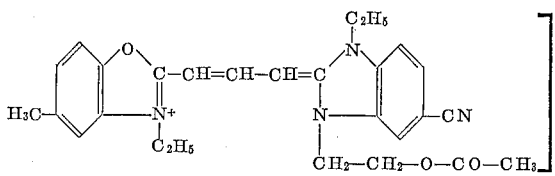

is prepared as follows: 3.1 g. of 1-ethyl-2-methyl-3-(β-hydroxyethyl)-5-cyano benzimidazolium bromide prepared according to Preparation 2, 2.8 g. of 2-(β-phenyl iminoethylidene)-3-ethyl-5-methyl benzoxazoline, 25 cm.³ of acetic anhydride and 2.8 cm.³ of triethylamine were stirred for two hours at room temperature, refluxed for 10 minutes and cooled. The dye precipitated on dilution with ether and was purified by three recrystallizations from ethanol. Melting point: 140° C. Absorption maximum: 491 mμ (log ε: 5.15).

*Example 7*

The dyestuff according to formula

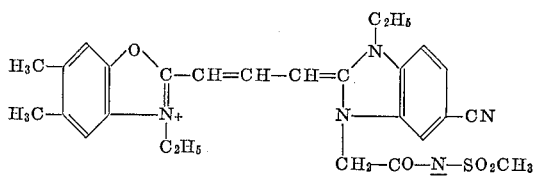

is prepared as follows: 4.8 g. of 1-ethyl-2-methyl-3-[N-(methylsulfonyl)carbamylmethyl]-5 - cyano - benzimidazolium bromide, prepared according to Preparation 3, 2.9 g. of 2-(β-phenyliminoethylidene) - 3 - ethyl - 5,6 - dimethylbenzoxazoline, 25 cm.³ of acetic anhydride and 2.8 cm.³ of triethylamine were stirred for two hours at room temperature and cooled overnight in the refrigerator. The dye crystallized and was purified by three recrystallizations from a mixture of methylcellosolve and ethanol. Melting point: not below 250° C. Absorption maximum: 498 mμ (log ε: 5.22).

*Example 8*

The dyestuff according to formula

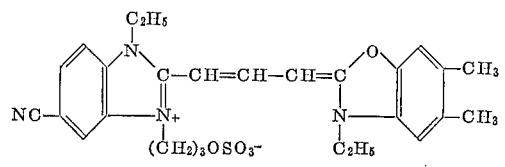

is prepared as follows: 3.2 g. of 1-ethyl-2-methyl-3-(γ-propylsulfate)-5-cyano benzimidazolium betaine prepared according to Preparation 4, 2.9 g. of 2-(β-phenylimino ethylidene)-3-ethyl - 5,6 - dimethylbenzoxazolium, 25 cm.³ of acetic anhydride and 2.8 cm.³ of triethylamine were stirred for 2 hours at room temperature, refluxed for 5 minutes and cooled. The dye was precipitated with ether and recrystallized three times from methylcellosolve. Melting point: not below 250° C. Absorption maximum: 500 mμ (log ε: 5.16).

*Example 9*

The dyestuff according to formula

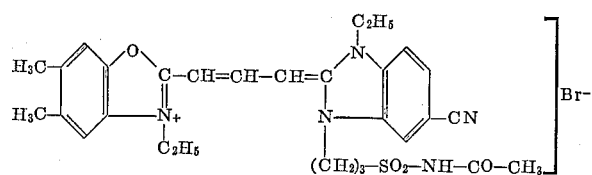

is prepared as follows: 4.3 g. of 1-ethyl-2-methyl-3-[γ-(acetylsulfonamido)propyl] - 5 - cyano benzimidazolium bromide, prepared according to Preparation 5, 2.9 g. of 2-(β-phenyliminoethylidene)-3-ethyl - 5,6 - dimethylbenzoxazoline, 25 cm.³ of acetic anhydride and 2.8 cm.³ of triethylamine were stirred for an hour at room temperature and refluxed for 10 minutes. After cooling, the dye was precipitated with ether and recrystallized three times from ethanol. Melting point: 162° C. Absorption maximum: 500 mμ (log ε: 5.17).

*Example 10*

The dyestuff according to formula

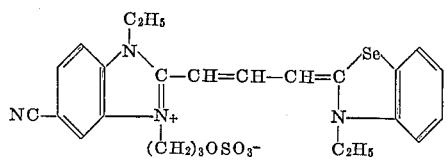

is prepared as follows: 3.23 g. of 1-ethyl-2-methyl-3-(γ-propylsulfate)-5-cyano benzimidazolium betaine, prepared according to Preparation 4, 3.27 g. of 2-(β-phenyliminoethylidene)-3-ethyl benzoselenazoline, 25 cm.³ of acetic anhydride and 1.4 cm.³ of triethylamine were refluxed for 5 minutes, cooled and diluted with ether. The dye was recrystallized three times from ethanol-acetone. Melting point: not below 260° C. Absorption maximum: 531 mμ (log ε: 5.03).

*Example 11*

The dyestuff according to formula

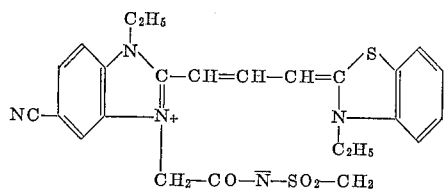

is prepared as follows: 4.8 g. of 1-ethyl-2-methyl-3-[N-(methylsulfonyl)carbamyl methyl] - 5 - cyano benzimidazolium bromide, prepared according to Preparation 3, 2.8 g. of 2-(β-phenylimino ethylidene)-3-ethyl-benzothiazoline, 25 cm.³ of acetic anhydride and 1.4 cm.³ of triethylamine were refluxed for 5 minutes and cooled. The dye was collected and recrystallized three times from ethanol. Melting point: not below 260° C. Absorption maximum: 524 mμ (log ε: 5.18).

*Example 12*

The dyestuff according to formula

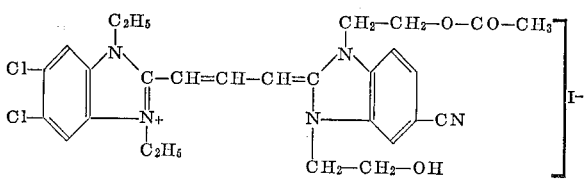

is prepared as follows: 1.8 g. of 1-(β-acetoxyethyl)-2-methyl - 3 - (β-hydroxyethyl) - 5 - cyano benzimidazolium bromide, prepared according to Preparation 7, 2.75 g. of 1,3-diethyl-2-[β-(p - tolusulfoanilido)vinyl] - 5,6 - dichlorobenzimidazolium chloride, 20 cm.³ of nitrobenzene and 1.4 cm.³ of triethylamine were refluxed for 15 minutes and cooled. The dye was precipitated with ether, converted into iodide with potassium iodide and recrystallized from ethanol. Melting point: 214° C. Absorption maximum: 515 mμ (log ε: 5.32).

*Example 13*

The dyestuff according to formula

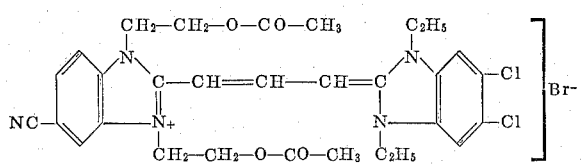

is prepared as follows: 4.1 g. of 1,3-bis-(β-acetoxyethyl)-2-methyl-5-cyano benzimidazolium bromide, prepared according to Preparation 8, 5.5 g. of 1,3-diethyl-2-[β-(p-tolusulfoanilido) - vinyl] - 5,6 - dichlorobenzimidazolium chloride, 30 cm.³ of nitrobenzene and 2.8 cm.³ of triethylamine were refluxed for 15 minutes. After cooling the dye precipitated on dilution with ether. It was purified by three recrystallizations from ethanol. Melting point: 163° C. Absorption maximum: 513 mμ (log ε:5.29).

*Example 14*

The dyestuff according to formula

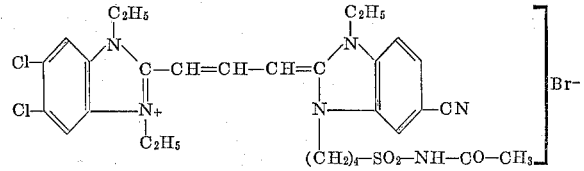

is prepared as follows: 4.4 g. of 1-ethyl-2-methyl-3-[δ-(acetylsulfonamido)butyl]-5-cyano benzimidazolium bromide prepared according to Preparation 6, 5.5 g. of 1,3-diethyl - 2 - [β - (p - tolusulfoanilido)vinyl] - 5,6 - dichlorobenzimidazolium chloride, 30 cm.³ of nitrobenzene and 2.8 cm.³ of triethylamine were refluxed for 15 minutes, cooled and the dye precipitated with ether. The pure dye was obtained after three recrystallizations from ethanol. Melting point: not below 250° C. Absorption maximum: 514 mμ (log ε:5.38).

*Example 15*

The dyestuff according to formula

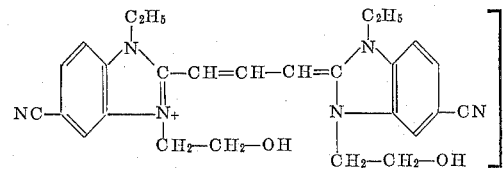

is prepared as follows: 5 g. of 1-ethyl-2-methyl-3-(β-hydroxyethyl)-5-cyano benzimidazolium bromide, prepared according to Preparation 2, 5 cm.³ of ethyl ortho formate and 25 cm.³ of nitrobenzene were refluxed for an hour, cooled and diluted with ether. The crude dye was converted into iodide and purified by three recrystallizations from ethanol. Melting point: 180° C. Absorption maximum: 517 mμ (log ε:5.31).

*Example 16*

The dyestuff according to formula

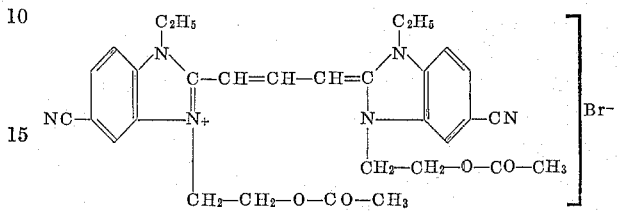

is prepared as follows: 7 g. of 1-ethyl-2-methyl-3-(β-acetoxyethyl)-5-cyano-benzimidazolium bromide prepared according to Preparation 9, 7 cm.³ of ethyl ortho formate, 30 cm.³ of nitrobenzene were refluxed for 1 hour, cooled and diluted with ether. The crude dye was recrystallized three times from ethanol. Melting point: not below 250° C. Absorption maximum: 514 mμ (log ε:5.34).

*Example 17*

The dyestuff according to formula

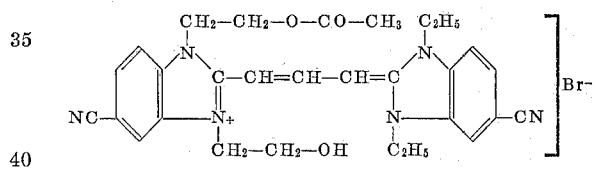

is prepared as follows: 1.8 g. of 1-(β-acetoxyethyl)-2-methyl-3-(β-hydroxyethyl)-5-cyano benzimidazolium bromide, prepared according to Preparation 7, 2.5 g. of 1,3-diethyl-2-[β-(p-tolusulfoanilido)vinyl]-5 - cyano benzimidazolium chloride, prepared according to Preparation 10, 20 cm.³ of pyridine and 1.4 cm.³ of triethylamine were refluxed for 1 hour. The dye was precipitated with ether and recrystallized three times from ethanol. Melting point: 188° C. Absorption maximum: 514 mμ (log ε:5.32).

*Example 18*

The dyestuff according to formula

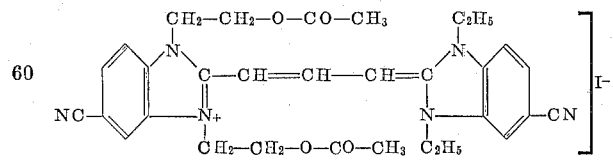

is prepared as follows: 4.1 g. of 1,3-bis-(β-acetoxyethyl)-2-methyl-5-cyano benzimidazolium bromide prepared according to Preparation 8, 5 g. of 1,3-diethyl-2-[β-(p-tolusulfoanilido)vinyl]-5-cyano benzimidazolium chloride prepared according to Preparation 10, 30 cm.³ of pyridine and 2.8 cm.³ of triethylamine were refluxed for 1 hour, cooled and diluted with ether. The dye was converted into iodide and recrystallized from ethanol four times. Melting point: 201° C. Absorption maximum: 512 mμ (log ε:5.28).

Example 19

The dyestuff according to formula

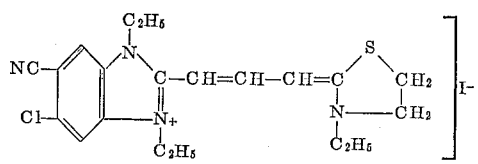

is prepared as follows: 1.35 g. of 1,3-diethyl-2-methyl-5-chloro-6-cyano benzimidazolium iodide, prepared according to Preparation 11, 1.1 g. of 2-(β-anilinovinyl)-3-ethyl thiazolinium bromide, 10 cm.³ of acetic anhydride and 1 cm.³ of triethylamine were refluxed for 15 minutes, cooled and diluted with ether. The precipitated dye was recrystallized once from ethanol-pyridine and once from methylcellosolve. Melting point: not below 250° C. Absorption maximum: 479 mμ (log ε: 5.18).

Example 20

The dyestuff according to formula

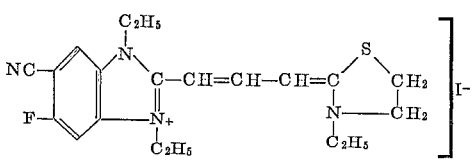

is prepared as follows: 1.8 g. of 1,3-diethyl-2-methyl-5-fluoro-6-cyano benzimidazolium iodide prepared according to Preparation 12, 1.5 g. of 2-(β-acetanilidovinyl)-3-ethyl-thiazolinium bromide, 15 cm.³ of ethanol and 1.4 cm.³ of triethylamine were refluxed for 20 minutes. On cooling the dye crystallized. It was recrystallized three times from ethanol. Melting point: 269° C. Absorption maximum: 472 mμ (log ε: 5.112).

Example 21

The dyestuff according to formula

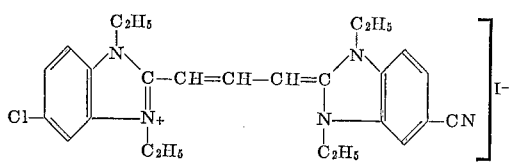

is prepared as follows: 1.7 g. of 1,3-diethyl-2-methyl-5-cyano benzimidazolium iodide prepared according to Preparation 1, 2.6 g. of 1,3-diethyl-2[β-(p-tolusulfoanilido)-vinyl]-5-chlorobenzimidazolium chloride, 15 cm.³ of nitrobenzene and 1.4 cm.³ of triethylamine were refluxed for 15 minutes, cooled, poured out into ether. The dye precipitated and was recrystallized three times from ethanol. Melting point: not below 250° C. Absorption maximum: 507 mμ (log ε: 5.33).

Example 22

The dyestuff according to formula

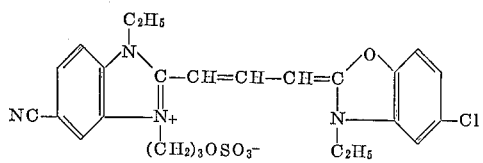

is prepared as follows: 3.2 g. of 1-ethyl-2-methyl-3-(γ-propylsulfate)-5-cyano benzimidazolium betaine prepared according to Preparation 4, 3.0 g. of 2-(β-phenylimino-ethylidene)-3-ethyl-5-chlorobenzoxazoline, 25 cm.³ of acetic anhydride and 1.4 cm.³ of triethylamine were refluxed for 5 minutes. On dilution with ether the dye precipitated. It was recrystallized three times from ethanol/dimethylsulfoxide. Melting point: not below 260° C. Absorption maximum: 488 mμ (log ε: 5.06).

Example 23

The dyestuff according to formula

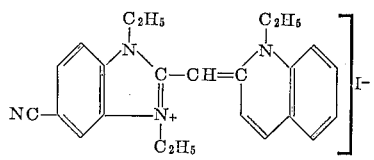

is prepared as follows: 3.4 g. of 1,3-diethyl-2-methyl-5-cyano benzimidazolium iodide prepared according to Preparation 1, 3.4 g. of 1-ethyl-2-ethylmercaptoquinolinium ethylsulfate, 40 cm.³ of ethanol and 1.4 cm.³ of triethylamine were refluxed for 5 minutes, cooled and the dye collected. It was purified by recrystallization from ethanol. Absorption maximum: 440 mμ.

Example 24

The dyestuff according to formula

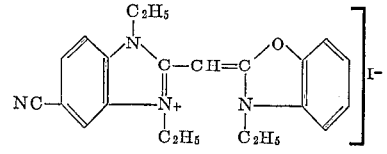

is prepared as follows: 3.4 g. of 1,3-diethyl-2-methyl-5-cyano benzimidazolium iodide prepared according to Preparation 1, 3.5 g. of 2-methylmercapto-3-methylbenzoxazolium p-tolusulfonate, 40 cm.³ of ethanol and 1.4 cm.³ of triethylamine were refluxed for 15 minutes. The dye was precipitated with ether and recrystallized from ethanol. Absorption maximum: 385 mμ.

Example 25

The dyestuff according to formula

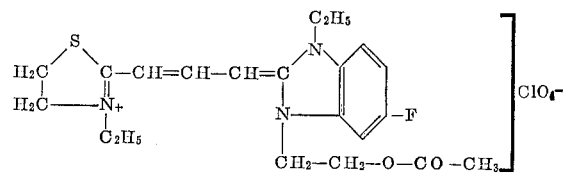

is prepared as follows: 1.5 g. of 1-ethyl-2-methyl-3-(β-hydroxyethyl)-5-fluorobenzimidazolium bromide prepared according to Preparation 13, 1.6 g. of 2-(β-anilinovinyl)-3-ethyl thiazolinium bromide, 20 cm.³ of acetic anhydride and 1.4 cm.³ of triethylamine were refluxed for 15 minutes, diluted with ether, the precipitate dissolved in ethanol and treated with sodium perchlorate. The dye was recrystallized twice from ethanol. Melting point: 234° C. Absorption maximum: 459 mμ (log ε: 4.89).

Example 26

The dyestuff according to formula

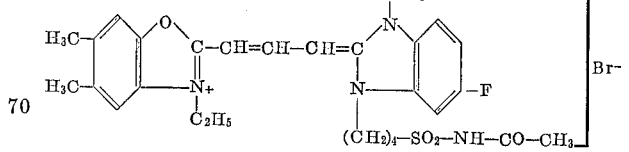

is prepared as follows: 2.2 g. of 1-ethyl-2-methyl-3-[δ-(acetyl sulfonamido)butyl] - 5 - fluorobenzimidazolium bromide, prepared according to Preparation 14, 1.45 g. of 2-(β-phenylimino ethylidene)-3-ethyl-5,6-dimethyl benzoxazoline, 20 cm.³ of acetic anhydride, 1.4 cm.³ of triethylamine were refluxed for 20 minutes. The dye was precipitated with ether and recrystallized three times from ethanol. Melting point: 210° C. Absorption maximum: 482 mμ (log ε: 5.07).

Example 27

The dyestuff according to formula

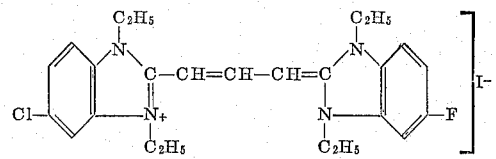

is prepared as follows: 1.3 g. of 1,3-diethyl-2-methyl-5-fluoro benzimidazolium iodide prepared according to Preparation 15, 2 g. of 1,3-diethyl-2-[β-(p-tolusulfoanilino)vinyl]-5-chloro benzimidazolium chloride prepared according to Preparation 16, 10 cm.³ of nitrobenzene and 1.1 cm.³ of triethylamine were refluxed for 15 minutes. After cooling, the dye was precipitated with ether and recrystallized three times from ethanol. Melting point: not below 250° C. Absorption maximum: 502 mμ (log ε: 5.28).

Example 28

The dyestuff according to formula

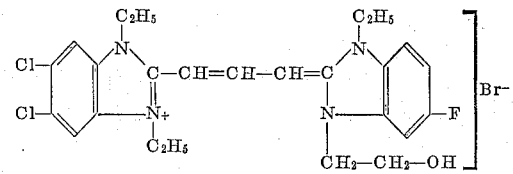

is prepared as follows: 1.5 g. of 1-ethyl-2-methyl-3-(β-hydroxyethyl)-5-fluoro benzimidazolium bromide, prepared according to Preparation 13, 2.75 g. of 1,3-diethyl-2-[β-(p-tolusulfoanilido)-vinyl] - 5,6 - dichlorobenzimidazolium cholride, 20 cm.³ of pyridine and 1.4 cm.³ of triethylamine were refluxed for 1 hour. The dye was precipitated with ether and recrystallized twice from ethanol. Melting point: not below 250° C. Absorption maximum: 514 mμ (log ε: 5.32).

Example 29

The dyestuff according to formula

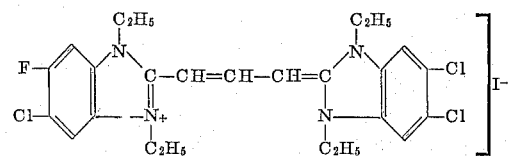

is prepared as follows: 1.85 g. of 1,3-diethyl-2-methyl-5-chloro-6-fluorobenzimidazolium iodide prepared according to Preparation 17, 2.75 g. of 1.3-diethyl-2-[β-(p-tolusulfoanilido)vinyl]-5,6-dichlorobenzimidazolium chloride prepared as described in Preparation 18, 15 cm.³ of nitrobenzene, 1.4 cm.³ of triethylamine were refluxed for 15 minutes and cooled. The dye was precipitated with ether and recrystallized three times from ethanol-pyridine. Melting point: not below 250° C. Absorption maximum: 508 mμ (log ε: 5.32).

Example 30

The dyestuff according to formula

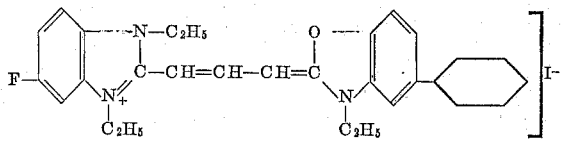

is prepared as follows: 1.7 g. of 1,3-diethyl-2-methyl-5-fluorobenzimidazolium iodide obtained according to Preparation 15, 1.7 g. of 2-(p-phenyl-iminoethylidene)-3-ethyl-5-phenyl benzoxazoline, 15 cm.³ of acetic anhydride and 1.4 cm.³ of triethylamine were refluxed for 15 minutes, cooled and diluted with ether. The dyestuff was purified by two recrystallizations from ethanol. Melting point: 250° C. Absorption maximum: 470 mμ (log ε: 4.88).

Example 31

The dyestuff according to formula

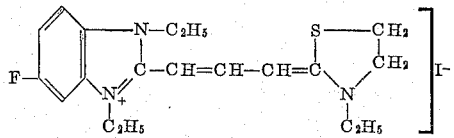

is prepared as follows: 3.34 g. of 1,3-diethyl-2-methyl-5-fluorobenzimidazolium iodide obtained according to Preparation 15, 3.55 g. of 2-(β-acetanilidovinyl)-3-ethylthiazolinium bromide, 25 cm.³ of pyridine and 2.8 cm.³ of triethylamine were refluxed for 15 minutes, cooled and diluted with water. The dyestuff was purified by two recrystallizations from ethanol. Melting point: 232° C. Absorption maximum: 460 mμ (log ε:4.87).

Example 32

The dyestuff according to formula

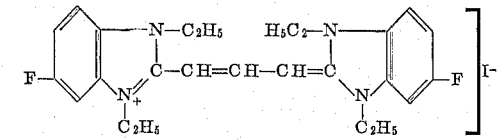

is prepared as follows: 5.7 g. of 1,3-diethyl-2-methyl-5-fluorobenzimidazolium iodide obtained according to Preparation 15, 8 cm.³ of ethyl-ortho-formate and 50 cm.³ of nitrobenzene were refluxed for 2 hours, cooled and diluted with ether. The dyestuff precipitated and was recrystallized from ethanol. Melting point: 267° C. Absorption maximum: 504 mμ (log ε:5.17).

Example 33

The dyestuff according to formula

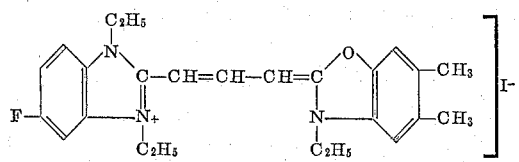

is prepared as follows: 3.34 g. of 1,3-diethyl-2-methyl-5-fluorobenzimidazolium iodide obtained according to Preparation 15, 2.92 g. of 2-(β-phenylimino ethylidene)-3-ethyl-5,6-dimethyl benzoxazoline, 25 cm.³ of acetic anhydride and 1.4 cm.³ of triethylamine were refluxed for 10 minutes. After cooling, the dyestuff was precipitated with ether and recrystallized from ethanol. Melting point: 260° C. Absorption maximum: 480 mμ (log ε:4.97).

Example 34

The dyestuff according to formula

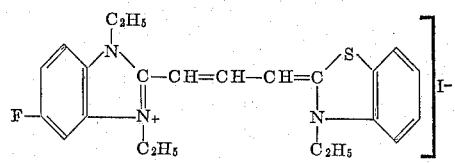

is prepared as follows: 3.34 g. of 1,3-diethyl-2-methyl-5-fluorobenzimidazolium iodide obtained according to Preparation 15, 2.80 g. of 2-(β-phenylimino ethylidene)-3-ethyl benzothiazoline, 50 cm.³ of acetic anhydride and 1.4 cm.³ of triethylamine were refluxed for 1 hour, cooled and poured into ether. The dyestuff precipitated and was recrystallized from ethanol. Melting point: 245° C. Absorption maximum: 507 mμ (log ε:5.00).

*Example 35*

The dyestuff according to formula

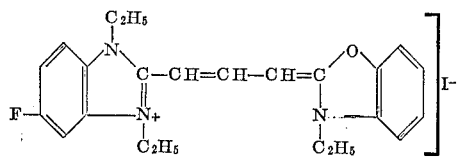

is prepared as follows: 3.34 g. of 1,3-diethyl-2-methyl-5-fluorobenzimidazolium iodide obtained according to Preparation 15, 2.64 g. of 2-(β-phenylimino ethylidene)-3-ethyl benzoxazoline, 30 cm.³ of acetic anhydride, and 1.4 cm.³ of triethylamine were refluxed for 30 minutes. On cooling, the dyestuff crystallized. It was purified by recrystallization from ethanol. Melting point: 255° C. Absorption maximum: 472 mμ. (log ε:5.00).

*Example 36*

The dyestuff according to formula

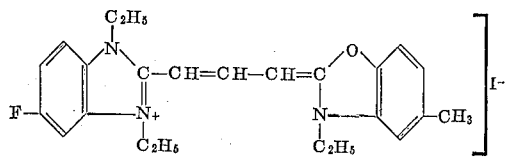

is prepared as follows: 3.34 g. of 1,3-diethyl-2-methyl-5-(β-phenylimino ethylidene)-3-ethylbenzoxazoline by 2.78 g. of 2-(β-phenylimino ethylidene)-3-ethyl-5-methylbenzoxazoline. Melting point: 247° C. Absorption maximum: 476 mμ (log ε:5.02).

*Example 37*

The dyestuff according to formula

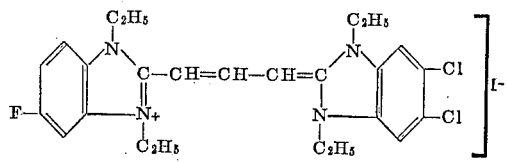

is prepared as follows: 3.34 g. of 1,3-diethyl-2-methyl-5-fluorobenzimidazolium iodide obtained according to Preparation 15, 5.5 g. of 1,3-diethyl-2-[β-(N-p-tolusulphonyl-anilino)-vinyl]-5,6-dichlorobenzimidazolium chloride, 50 cm.³ of pyridine and 1.4 cm.³ of triethylamine were refluxed for 15 minutes. On cooling, the dyestuff crystallized. It was purified by recrystallization from ethanol. Melting point: not below 260° C. Absorption maximum: 510 mμ (log ε:5.31).

As will be shown in the following table, the new cyanine dye salts spectrally sensitize photographic silver halide emulsions when incorporated therein. Although the new cyanine dye salts are useful especially for extending the spectral sensitivity of the customarily employed gelatino silver chloride, gelatino silver chloro-bromide, gelatino silver bromide, gelatino silver bromo-iodide and gelatino silver chloro-bromo-iodide emulsions, photographic emulsions containing water-permeable colloids other than gelatin, such as agar-agar, zeine, collodion, water-soluble cellulose derivatives, polyvinyl alcohol or other hydrophilic synthetic or natural resins or polymeric compounds, may equally well be sensitized according to the present invention.

To prepare photographic emulsions sensitized according to the invention with one or more of the new cyanine dye salts, the dye salt or salts can be incorporated in the photographic emulsion by one of the methods customarily employed in the art. In practice, it is convenient to add the dye salts to the emulsion in the form of a solution in an appropriate solvent. The dye salts are advantageously incorporated in the finished, washed emulsions and should be uniformly distributed throughout the emulsion. The concentration of the dye salts in the emulsion can vary widely, for example from 1 to 100 mg. per kg. of flowable emulsion and will vary according to the effect desired. The suitable and most economical concentration for any given emulsion will be apparent to those skilled in the art, upon making the ordinary tests and observations customarily used in the art of emulsion making.

The new cyanine dye salts can be incorporated into photographic emulsions the general sensitivity of which has been increased by physical and chemical ripening. As suitable chemical sensitizers may be mentioned the well-known sulphur sensitizers such as allylisothiocyanate, allythiourea, sodium thiosulphate, potassium selenocyanide and the natural sensitizers originating in the gelatin, reducing sensitizers such as the imino-aminomethane sulphinic acid and the derivatives thereof, and the salts of noble metals such as gold, platinum and palladium.

The photographic emulsions optically sensitized according to the invention may further be supersensitized and/or hypersensitized by one of the methods known to those skilled in the art.

In preparing the photographic emulsions according to the invention, the usual and suitable addenda such as antifogging agents, stabilizers, antibronzing agents, hardeners, wetting agents, plasticizers, development accelerators, color couplers, fluorescent brighteners and ultraviolet screening compounds can moreover be incorporated in the emlusion in the manner customarily employed in the art. In this respect it may be mentioned that the sensitivity of the silver halide emulsions sensitized according to the process of the present invention is not adversely affected but rather enhanced by the presence therein of certain fluorescent compounds. Another advantage of the process for sensitizing silver halide emulsions according to the present invention is the compatibility of the new cyanine dye salts with anionic wetting agents and with color couplers, which is of great importance in the application of the new cyanine dye salts for sensitizing the silver halide emulsions of a light-sensitive element for color photography. The compatibiltiy of the new cyanine dye salts with color couplers is especially noteworthy in the case of the symmetrical carbocyanine dye salts and in the case of the asymmetrical carbocyanine dye salts containing on one side of the methine chain a cyano and/or fluoro-substituted benzimidazole nucleus and on the other side a phenyl substituted benzoxazole nucleus or a halogen substituted benzimidazole nucleus.

Another important and valuable advantage of most of the new sensitizing dye salts is the preparation of highly sensitive photographic silver halide emulsions which give, after development and fixing of the exposed photographic element, a finished photograph which is essentially free from any residual stain. This property is especially marked by the cyano substituted dye salts.

Some of the new cyanine dye salts such as those which bear two differently or identically substituted benzimidazole nuclei, show interesting super-sensitizing properties when incorporated in silver halide emulsions.

Emulsions sensitized with the new cyanine dye salts can be coated in the usual manner on a suitable support such as glass, cellulose derivative film, resin film or paper.

The following table will serve to illustrate further the manner of practising the invention. The optimum amounts of sensitizing dye salt have been incorporated into different portions of photographic gelatino-silver-halide emulsions prepared with varying contents and kinds of halides. The different portions of emulsions were then coated on supports and exposed in the usual manner in a spectrograph and a sensitometer through a yellow filter which transmits no light of wavelengths shorter than 510 mμ, for example a filter sold under the name "Geva" No. 4 filter. The following are several examples of such emulsions together with the speed (minus blue) obtained after development of the exposed emulsion coatings in the usual manner. These speed values are calculated in relation to the speed values of respectively the same but non-sensitized emulsions.

| Dye of Example | Mg. dye per kg. emulsion | Kind of emulsion | Max./range | Speed (minus blue) |
|---|---|---|---|---|
| 1 | 20 | AgBr/I | 585/595 | 305 |
| 2 | 30 | AgCl | 535/555 | 265 |
|  | 30 | AgCl/Br | 560/580 | 250 |
| 3 | 30 | AgCl | 540/570 | 255 |
| 4 | 20 | AgBr | 525/555 | 265 |
| 5 | 20 | AgBr | 520/540 | 200 |
| 6 | 30 | AgBr/I | 555/575 | 230 |
| 7 | 30 | AgCl/Br | 545/580 | 215 |
| 8 | 30 | AgBr/I | 570/590 | 230 |
|  | 30 | AgBr | 545/580 | 255 |
| 9 | 30 | AgBr/I | 570/590 | 255 |
|  | 30 | AgBr | 545/585 | 275 |
| 10 | 30 | AgBr/I | 600/630 | 325 |
| 11 | 30 | AgBr/I | 585/605 | 305 |
| 12 | 40 | AgBr | 580/600 | 275 |
| 13 | 40 | AgBr | 575/595 | 255 |
| 14 | 40 | AgBr | 590/605 | 270 |
| 16 | 30 | AgCl/Br | 585/605 | 295 |
| 17 | 30 | AgBr/I | 585/605 | 305 |
| 19 | 10 | AgBr | 540/560 | 270 |
| 20 | 100 | AgCl | 440/475 | (¹) |
| 21 | 30 | AgBr | 580/605 | 340 |
| 22 | 30 | AgCl | 530/555 | 210 |
|  | 30 | AgCl/Br | 565/585 | 325 |
| 25 | 20 | AgCl | 490/520 | 255 |
| 26 | 30 | AgBr/I | 550/565 | 230 |
| 27 | 20 | AgCl | 570/585 | 385 |
| 28 | 20 | AgCl | 580/600 | 385 |
| 30 | 20 | AgBr | 525/555 | 145 |
| 31 | 20 | AgBr | 520/540 | 165 |
| 32 | 30 | AgBr/I | 570/595 | 280 |
| 33 | 20 | AgCl/Br | 520/555 | 200 |
| 34 | 30 | AgCl | 555/580 | 235 |
|  | 50 | AgBr/I | 590/605 | 270 |
| 35 | 30 | AgCl | 515/540 | 110 |
| 36 | 30 | AgCl | 525/545 | 130 |
| 37 | 15 | AgBr/I | 575/600 | 330 |

¹ Total speed 195.

We claim:

1. A light-sensitive silver halide photographic emulsion containing as a sensitizing dye a cyanine dye salt having the formula:

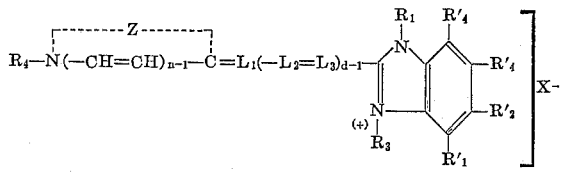

wherein R′₁, R′₂, R′₃ and R′₄ each represents a member selected from the group consisting of a hydorgen atom, a chlorine atom, a bromine atom, a fluorine atom and a cyano group, at least one of R′₁, R′₂, R′₃ and R′₄ being a member selected from the group consisting of a fluorine atom and a cyano group; R₁, R₃ and R₄ each represents a member of the group consisting of alkyl, phenyl, carboxyphenyl and cyclohexyl; L₁, L₂ and L₃ each represents a methine group; n represents a positive integer from 1 to 2; d represents a positive integer from 1 to 4; Z represents the non-metallic atoms necessary to complete a nitrogenus heterocyclic nucleus selected from the group consisting of a thiazole nucleus, a benzothiazole nucleus, a naphthothiazole nucleus, a thionaphthenothiazole, an oxazole nucleus, a benzoxazole nucleus, naphthoxazole nucleus, selenazole nucleus, benzoselenazole nucleus, naphthoselenazole nucleus, thiazoline nucleus, thiazolidine nucleus, oxazoline nucleus, oxazolidine nucleus, selenazoline nucleus, quinoline nucleus, isoquinoline nucleus, dialkylindolenine nucleus, pyridine nucleus and benzimidazole nucleus; and X represents an acid radical of the type used in cyanine dyes.

2. A light-sensitive silver halide photographic emulsion containing as a sensitizing dye a cyanine dye salt according to claim 1 wherein Z represents the atoms necessary to complete a benzimidazole nucleus wherein at least one of the hydrogen atoms in the 5- and 6-positions of the benzene ring forming part of said benzimidazole nucleus is substituted by a halogen atom.

3. A light-sensitive silver halide photographic emulsion containing as a sensitizing dye a symmetrical dibenzimidazolo-carbocyanine dye salt according to claim 1 wherein one of the hydrogen atoms in each of the benzene rings forming part of the benzimidazole nuceli is substituted by a cyano group.

4. A light-sensitive silver halide photographic emulsion containing as a sensitizing dye an asymmetrical dibenzimidazolo-carbocyanine dye salt according to claim 1 wherein one benzimidazole nucleus is a 5,6-dichlorobenzimidazole nucleus.

5. A light-sensitive silver halide photographic emulsion containing as a sensitizing dye a benzoxazolo-benzimidazolo-carbocyanine dye salt according to claim 1 wherein the hydrogen atom in the 5-position of the benzene ring forming part of the benzoxazole nucleus is substituted by an aryl group.

6. A light-sensitive photographic emulsion containing as a sensitizing dye an asymmetrical benzimidazolo carbocyanine dye salt according to claim 1 wherein Z represents the atoms to complete a thiazoline nucleus.

7. The light-sensitive silver halide photographic emulsion of claim 1 wherein the cyanine dye is:

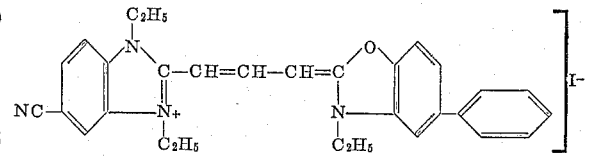

8. The light-sensitive silver halide photographic emulsion of claim 1 wherein the cyanine dye is:

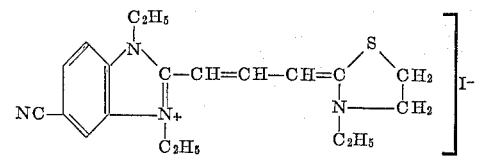

9. The light-sensitive silver halide photographic emulsion of claim 1 wherein the cyanine dye is:

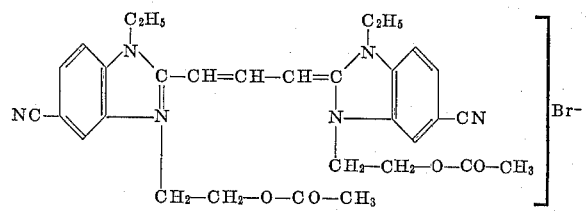

10. The light-sensitive silver halide photographic emulsion of claim 1 wherein the cyanine dye is:

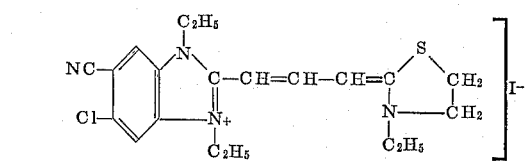

11. The light-sensitive silver halide photographic emulsion of claim 1 wherein the cyanine dye is:

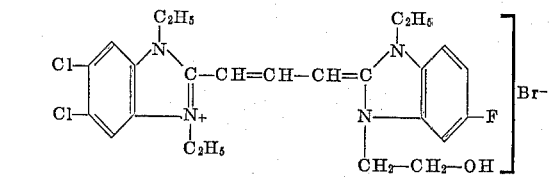

12. The photographic emulsion of claim 1 wherein alkyl is a member of the group consisting of methyl, ethyl, propyl, isopropyl, butyl, isobutyl, allyl, β-hydroxyethyl, β-acetoxyethyl, sulfoethyl, sulfopropyl, sulfobutyl, propylsulfate, butylsulfate, benzyl, carboxybenzyl, omega-acetyl sulfonamidapropyl, omega-acetyl sulfonamidabutyl, and β-methylsulfonylamino ethyl.

References Cited by the Examiner
UNITED STATES PATENTS

| | | | |
|---|---|---|---|
| 2,256,163 | 9/1941 | Kumetat et al. | 96—106 |
| 2,918,369 | 12/1959 | Doorenbos | 96—106 |
| 3,090,782 | 5/1963 | Coenen et al. | 96—106 |

NORMAN G. TORCHIN, *Primary Examiner.*

J. T. BROWN, C. E. VAN HORN, *Assistant Examiners.*